United States Patent [19]

Bourret et al.

[11] 3,848,975

[45] Nov. 19, 1974

[54] SOUND FILM SYNCHRONIZATION SYSTEM AND METHOD

[76] Inventors: Phillip L. Bourret, P.O. Box 128, Los Altos, Calif. 94022; Simon Yin, 3074 Locke Ct., Fremont, Calif. 94536

[22] Filed: June 1, 1973

[21] Appl. No.: 365,829

[52] U.S. Cl. .......................... 352/5, 352/12, 352/17, 352/20, 352/22

[51] Int. Cl. .......................... G03b 31/04

[58] Field of Search .............. 352/5, 12, 15, 16, 17, 352/19, 20, 22

[56] References Cited

UNITED STATES PATENTS 3,690,746 9/1972 Kotler et al. .......................... 352/12

3,697,158 10/1972 Mateja .......................... 352/17

*Primary Examiner*—Samuel S. Matthews
*Assistant Examiner*—Russell E. Adams, Jr.
*Attorney, Agent, or Firm*—Flehr, Hohbach, Test, Albritton & Herbert

[57] ABSTRACT

A system for frame-by-frame synchronization of film and magnetic tape comprising a tape transport means, a film transport means, and control means, said control means interconnecting the tape and film means, and said control means adapted to provide system control to the film means at non-performance speeds, and to transition system control to the tape means at performance speeds and method for achieving same.

9 Claims, 1 Drawing Figure

PATENTED NOV 19 1974

3,848,975

SOUND FILM SYNCHRONIZATION SYSTEM AND METHOD

BACKGROUND OF THE INVENTION

This invention relates generally to the system and method for frame-by-frame interlocked synchronization of separate film and magnetic tape sound tracks.

In the motion picture and recording industry, when motion picture film is exposed, a separate magnetic tape sound recording is simultaneously recorded for later combination in a final, edited, composite sound film. In the laboratory editing process, the film and magnetic sound tape must be precisely synchronized to achieve a professional product.

At present synchronization of separate film and tape means is achieved by direct-coupling the film and tape transports either by a flexible coupling between the projector and the tape machine or by interlocked selsyn motors coupled to each transport.

Because direct mechanical coupling between the projector and tape machine becomes unwieldy and impractical when multiple projectors and tape machines must be synchronized, the selsyn interlock system has become the most widely used system. In this system the interlocking selsyn motors and machine drive motors share a common shaft. The selsyn motor overcomes any speed changes in the drive motor of each machine so that all machines in the system move in constant synchronism. Because each selsyn motor must counteract and regulate powerful driving motors, large selsyn motors are required. The large selsyn motors require a large external distributor including a synchronus motor coupled to a selsyn generator for rotating power. The size and weight of the selsyns, the gears, timing belts and additional mechanical couplings as well as the constant interaction between the selsyn and driving motors, causes poor mechanical stability and degrades the smooth rotation required for sound reproduction free of flutter and wow. Sophisticated mechanical filters must be included for acceptable sound quality. Accordingly, a useable synchronization system is complicated, bulky and expensive.

The complexity of the present selsyn system makes the system difficult to adjust and maintain. Further, the interactive mass and accompanying inertia of the rotating machinery in present direct-coupled systems are incompatible with the fragile film and tape the systems must handle. Clearly an improved synchronization system which minimizes controlled mass and retains full flexibility at a fraction of the cost, size and weight of present systems is desired.

OBJECTS AND SUMMARY OF THE INVENTION

It is a general object of the present invention to provide an improved sound film synchronization system.

It is another object of the present invention to provide a sound film synchronization system having improved film and tape handling flexibility at a fraction of the cost, size and weight of present systems.

It is another object of the present invention to provide a method of synchronizing film and sound tape with greater handling compatibility than present systems.

The foregoing and other objects of the invention are achieved by a film and magnetic tape synchronization system including a tape transport means, film transport means, and control means, said control means interconnecting tape and film means, and said control means adapted to provide system control to the film means at non-performance speeds, and transition system control to the tape means at performance speeds.

DESCRIPTION OF PREFERRED EMBODIMENT

Figure 1:
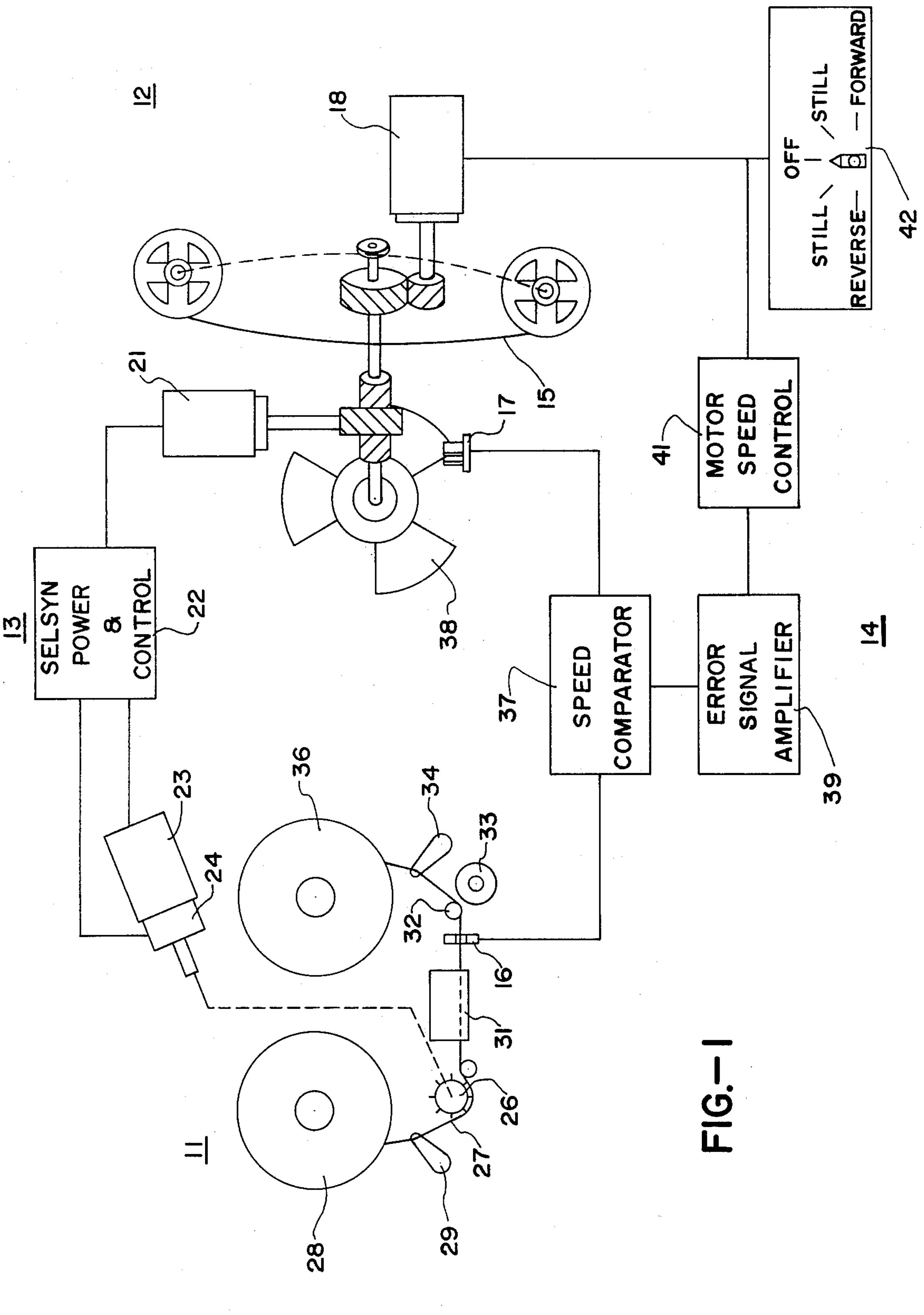
FIG. 1 is a system block diagram, with major elements of the system symbolically represented.

Referring to FIG. 1, the overall block diagram of the sound-film synchronization system is shown including magnetic tape transport 11, film transport 12, first control loop 13, and second control loop 14. In the upper portion of the diagram the selsyn electro-magnetic first control loop 13 interconnects film transport 12 and tape transport 11. In the lower portion of the diagram the electronic second control loop 14 senses tape motion at transducer 16 and film transport motion at transducer 17 and compares, amplifies and controls film drive motor 18 thus maintaining synchronization of the tape and film transports.

More particularly, selsyn transmitter 21 is responsive to the motion of film transport 12 and transmits receiver 23. Thus a change in the shaft position of selsyn transmitter 21 will produce a corresponding and identical shaft positional change in the selsyn receiver 23 output shaft. The output shaft of selsyn receiver 23 is directly coupled via electro-magnetic clutch 24 to tape sprocket 26 which directly controls the magnetic tape 27. The magnetic tape 27 is standard audio tape with perforations identical to the perforations of the film, such as 8, 16, or 35mm. The tape 27 on the tape transport 11 passes from the left or supply reel 28 over tension lever 29, is engaged and controlled by tape sprocket 26 and passes over transducer 31. The tape passes tape motion transducer 16, between capstan drive 32 and pinch roller 33, and over tension lever 34 to be received by the right or take-up reel 36.

Continuing, tape motion transducer 16 senses the perforations in the magnetic tape 27 and transmits a corresponding signal to speed comparator 37. Film transport motion transducer 17 transmits a signal corresponding to shutter 38 motion to speed comparator 37 which compares the outputs of the two transducers 16 and 17. The output of speed comparator 37 is a function of the difference in speed or speed change of tape 27 and film 15. A difference in speed between magnetic tape 27 and shutter 38, directly coupled to film 15, derives an error signal at the output of speed comparator 37, the error signal is amplified in error signal amplifier 39 and drives motor speed control 41. The error signal amplifier 39 has sufficient gain to drive motor speed control 41 which in turn changes the speed of film drive motor 18 to reduce the error signal to zero. Many well known comparison and control systems may be used so long as tape motion and film motion are compared with any resulting error amplified to correct drive motor 18.

A film transport actuator 42, such as a multiposition selector switch, provides a center or OFF position, a FORWARD position wherein the film moves in a forward direction at performance speed for motion picture viewing, and interposed between the FORWARD and OFF positions a STILL position wherein film motion ceases and individual film frames may be viewed. A like STILL position is provided between the OFF position and the REVERSE position of film transport actuator 42. In the REVERSE position the film reverses to permit review of previously viewed film. Further film transport actuator 42 actuates the electronic second control loop 14, which as we shall presently see, maintains system synchronization performance speed, that is the speed at which the motion picture is performed or viewed. The electronic second control loop 14 is actuated only in the FORWARD switch position which selects the performance mode. All other switch positions are non-performance modes. In the STILL switch positions individual frames of the exposed film are projected and portions of the film 15 may be viewed by manually manipulating the film transport 12 and selectively editing undesired frames. As will be presently seen corresponding segments of the magnetic tape 27 will be simultaneously positioned and be likewise edited with the corresponding film excerpts.

Turning now to operation, once recorded magnetic tape 27 is loaded on tape transport 11 and film 15 on film transport 12, with each initially positioned to the slate mark or beginning of the respective recordings, the system is ready for use. When film transport actuator 42 is actuated by selecting the FORWARD position, film and tape transports are energized, film drive motor 18 drives film transport 12 and the electro-mechanical first control loop 13 immediately becomes responsive to the motion of film transport 12. Selsyn transmitter 21 transmits film transport 12 motion to selsyn receiver 23 which causes tape sprocket 26 to control the movement of tape 27. Simultaneously, tape transport 11 drives only take-up reel 36 and supply reel 28, which together transport and maintain minimum tension on tape 27. Thus tape sprocket 26 merely controls the movement of tape 27, and tape transport 11 provides the tape driving power. Tape sprocket 26 synchronizes tape motion with the increasing speed of the film transport 12. Accordingly, as drive motor 18 drives and accelerates the system to performance speed, film transport 12 and tape transport 11 maintain synchronization.

Actuation of film transport actuator 42 to the FORWARD position simultaneously energized the electronic second control loop 14. Loop 14 compares the movement of magnetic tape perforations past transducer 16 with the movement of shutter 38 moving past film transport motion sensor 17. Any speed differential derives an error signal in comparator 37, the error signal is amplified in amplifier 39, drives motor speed control 41 and effects a change in the speed of film drive motor 18 to reduce the error signal to zero, and thus maintains frame-by-frame synchronization.

Continuing with system operation, as the speed of the synchronized film and tape approaches performance or viewing speed, and falls within a speed interval relatively near performance speed the tape pinch roller 33 and capstan drive 32 become operative. The speed interval may be ± 20 percent of the performance speed. Within this interval pinch roller 33 engages capstan drive 32 and thereby drives tape 27 causing the tape to maintain the speed of capstan drive 32, and thus determine performance speed. Simultaneously first control loop 22 is de-energized, such as by disengaging electromagnetic clutch 24 or by deactivating selsyn control 22. At this point the tape transport 11 has achieved control in the synchronization system, said control previously being in the electro-mechanical first control loop 13. The selsyns 21 and 23 of loop 13 although possessing some mass and inertia, now free-wheel subservient to the control assumed by loop 14. Thus the first control loop 13 is no longer responsive to film transport 12 and adapted to control tape transport 11. Rather capstan drive 32 now determines performance speed, system stability and thereby flutter and wow of the recorded sound.

Moreover transitions to and from performance speed are smoothly effected by the first and second loops. The first loop 13 synchronizes the system during speed transitions, yet introduces minimum mechanical mass and inertia into the second loop 14, the electronic control loop, which provides high stability in the performance mode.

It is readily apparent that multiple tape transports may be slaved to the described master system by merely adding slaved selsyn receivers 23 and transducers 16 to each additional tape transport. The slave transducer 16 signal is compared with the master transducer 16 signal and any error corrects the speed of the additional tape transport. If desired multiple film transports may likewise be slaved to the described master system by merely adding slaved selsyn transmitters 21, transducers 17, and comparison and drive circuitry to each additional film transport. By slaving multiple tape transports, multiple track sound special effects may be added during editing. Thus full flexibility, with sound quality free of flutter and wow has been achieved in a sound film synchronization system at only a fraction of the cost, size and weight of the present complicated, bulky and expensive selsyn systems.

We claim:

1. A film and magnetic tape synchronization system including tape transport means for conveying tape past a transducer, film transport means for conveying film for projection and control means interconnected between the tape and film transport means, said control means including means responsive to the motion of the film transport means to control the motion of the tape transport means at non-performance speeds, and means responsive to the motion of the tape transport means to control the motion of the film transport means at performance speeds so that constant frame-by-frame synchronization of film and tape is provided.

2. A film and magnetic tape synchronization system as in claim 1 wherein said control means includes a first control loop responsive to the motion of the film transport means, the first control loop adapted to control the motion of the tape transport means, the first loop operative in non-performance speeds and transitions to and from performance speeds, a second control loop responsive to the motion of the tape transport means, the second control loop adapted to control the motion of said film transport means, the second loop operative only when performance speed is attained.

3. A film and magnetic tape synchronization system including a tape transport, the tape transport having a constant speed capstan drive, a film transport, an actuator means for the film transport, and a control means including a first control loop responsive to the motion of the film transport and adapted to control the motion of the tape transport, a second control loop responsive to the motion of the tape transport and adapted to control the motion of the film transport, so that when the actuator means for the film transport is actuated, the tape transport accelerates to synchronize the motion of the tape transport with the increasing speed of the film transport, the film transport ceases accelerating as it approaches performance speed, the tape transport constant speed capstan drive becomes operative within a speed interval relatively near performance speed, simultaneously the first loop becomes inoperative, said capstan drive thereafter maintaining performance speed and the second loop controlling the motion of the film transport, and when the actuator means for the film transport is de-actuated, simultaneously the capstan drive is disengaged, and the first loop becomes operative, the film and tape transports decelerate from performance speed, with the first loop maintaining frame-by-frame synchronization as the film and tape transports decelerate to a stop.

4. A film and magnetic tape synchronization system as in claim 3 wherein the first loop includes an electromechanical sensor and an electro-mechanical control and the second loop includes an electronic transducer.

5. In a method for synchronizing the motion of film and magnetic tape transports in a system of the type providing a tape transport, providing a film transport, and providing a control interconnecting said tape and film transports, the method comprising controlling the motion of said tape transport at non-performance speeds in response to the motion of said film transport causing said tape transport to move simultaneously with said film transport, and controlling the motion of said film transport at performance speeds in response to the motion of said tape transport causing said film transport to move simultaneously with said tape transport so that constant frame-by-frame synchronization of film and tape is provided.

6. A method as in claim 5, except that the step of providing a control includes the additional steps of providing a first control loop responsive to the motion of the film transport means, said first control loop adapted to control the motion of the tape transport means, said first loop operative in non-performance speeds and transitions to and from performance speeds, providing a second control loop responsive to the motion of the tape transport means, said second control loop adapted to control the motion of the film transport means, said second loop operative only when performance speed is attained.

7. In a method for synchronizing film and magnetic tape in a system of the type providing a tape transport, the tape transport having a constant speed capstan drive, providing a film transport, providing an actuator means for the film transport, providing a control including a first control loop responsive to the motion of the film transport and adapted to control the motion of the tape transport, a second control loop responsive to the motion of the tape transport and adapted to control the motion of the film transport, the method comprising controlling the motion of said tape transport at non-performance speeds in response to the motion of said film transport causing said tape transport to move simultaneously with said film transport, and controlling the motion of said film transport at performance speeds in response to the motion of said tape transport causing said film transport to move simultaneously with said tape transport, said steps further including actuating the film transport, actuating and accelerating the tape transport to synchronize the motion of the tape transport with the increasing speed of the film transport, causing the film transport to cease accelerating as it approached performance speed, causing the simultaneously moving tape transport to cease accelerating, actuating the tape transport constant speed capstan drive within a speed interval relatively near performance speed, and simultaneously causing the first loop to becomes inoperative maintaining performance speed by said capstan drive, and controlling by the second loop the motion of the simultaneously moving film transport whereby synchronization to performance speed is achieved and maintained, said synchronization from performance speed further including deactuating the film transport, disengaging the capstan drive, causing the first loop to become operative, decelerating the film and tape transports from performance speed, thereby maintaining frame-by-frame synchronization as the simultaneously moving film and tape transports decelerate to a stop.

8. A method as in claim 7 except that in the step of actuating the film transport, the film transport is manually displaced.

9. A method as in claim 7 except that in the step of actuating the film transport, said transport is driven externally.

* * * * *